US009966764B2

(12) United States Patent
Buffenbarger et al.

(10) Patent No.: US 9,966,764 B2
(45) Date of Patent: May 8, 2018

(54) NO BREAK POWER TRANSFER FOR MULTI-SOURCE ELECTRICAL POWER SYSTEM

(71) Applicant: GE Aviation Systems LLC, Grand Rapids, MI (US)

(72) Inventors: Ryan Buffenbarger, New Carlisle, OH (US); Jinhui Zhang, Dayton, OH (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 164 days.

(21) Appl. No.: 14/927,631

(22) Filed: Oct. 30, 2015

(65) Prior Publication Data

US 2017/0126018 A1    May 4, 2017

(51) Int. Cl.
 *H02J 5/00* (2016.01)
 *H02M 7/04* (2006.01)
 *H02J 4/00* (2006.01)
 *H02J 9/06* (2006.01)

(52) U.S. Cl.
 CPC ........ *H02J 5/00* (2013.01); *H02J 4/00* (2013.01); *H02J 9/06* (2013.01); *H02M 7/04* (2013.01)

(58) Field of Classification Search
 None
 See application file for complete search history.

(56) References Cited

U.S. PATENT DOCUMENTS

| 5,729,059 A | 3/1998 | Kilroy et al. | |
|---|---|---|---|
| 2005/0273206 A1 | 12/2005 | McGinley | |
| 2007/0273213 A1* | 11/2007 | Wang | H02J 3/04 307/66 |

(Continued)

FOREIGN PATENT DOCUMENTS

| CN | 1050800 A | 4/1991 |
|---|---|---|
| CN | 101014918 A | 8/2007 |
| CN | 102279614 A | 12/2011 |

OTHER PUBLICATIONS

Combined Search and Examination Report issued in connection with corresponding GB Application No. 1617978.0 dated Apr. 10, 2017.

(Continued)

*Primary Examiner* — Jared Fureman
*Assistant Examiner* — Aqeel Bukhari
(74) *Attorney, Agent, or Firm* — GE Aviation Patent Operation; William Scott Andes (57) ABSTRACT

Systems and methods for transferring power delivery between power sources to an electrical bus are provided. More particularly, a multi-source electrical power system can include an electrical bus having at least two power sources that each can be selectively coupled to the electrical bus, for instance, via contactors. At least one of the power sources can include a unidirectional or bidirectional power converter. The electrical power system can further include a control system configured to control the power output (e.g., the output voltage and the output current) of the power converter to provide no break power transfer of power delivery to the electrical bus between the first and second power sources. In example embodiments, the no break power transfer can be achieved by regulating the output current of a power source to a fixed current value and/or by using a virtual resistance programmed into a voltage regulator.

18 Claims, 4 Drawing Sheets

(56) References Cited

U.S. PATENT DOCUMENTS

| | | |
|---|---|---|
| 2009/0261586 A1* | 10/2009 | Maddali ............... H02P 9/305 |
| | | 290/6 |
| 2010/0164452 A1 | 7/2010 | Ruan et al. |
| 2010/0225289 A1 | 9/2010 | Chang |
| 2010/0276996 A1 | 11/2010 | Karipides |
| 2012/0105023 A1 | 5/2012 | Schauder et al. |
| 2012/0139354 A1 | 6/2012 | Said |
| 2014/0153302 A1 | 6/2014 | Schauder et al. |
| 2014/0167516 A1* | 6/2014 | Gataric ................. H02J 1/12 |
| | | 307/84 |
| 2015/0035358 A1 | 2/2015 | Linkhart et al. |

OTHER PUBLICATIONS

Machine Translation and First Office Action and Search issued in connection with corresponding CN Application No. 201610966376.7 dated Nov. 16, 2017.

Office Action issued in connection with corresponding CA Application No. 2945907 dated Aug. 24, 2017.

\* cited by examiner

FIG. 4

NO BREAK POWER TRANSFER FOR MULTI-SOURCE ELECTRICAL POWER SYSTEM

FIELD OF THE INVENTION

The present subject matter relates generally to multi-source electrical power systems, and more particularly to transferring power among power sources in a multi-source electrical power system.

BACKGROUND OF THE INVENTION

A multi-source electrical power system can include an electrical bus that can receive power from multiple power sources. For instance, contactors or other switching elements can be used to selectively couple each of the multiple power sources to the electrical bus. At least one of the power sources coupled to the electrical bus can include a power converter used to convert the power generated by a power source to a power suitable for the electrical bus.

For instance, in an aviation system, electrical power for avionics, motors, and other electrical equipment on an aircraft can be provided by multiple generator systems coupled to the electrical bus. Each generator system can include a generator coupled to a gas turbine engine. Each generator can convert mechanical energy generated by the gas turbine engine to alternating current (AC) power. A power converter can be used to convert the generated AC power to a direct current (DC) power for a DC electrical bus.

It can be desirable in certain circumstances to switch power delivery between power sources coupled to the electrical bus. For instance, it may be desirable to transfer power delivery from one of the multiple power sources to another power source. Transferring power delivery between power sources coupled to the electrical bus can lead to power interruptions and/or disturbances in power quality, such as voltage dips or voltage spikes or high circulating current between the related sources.

For instance, in AC systems, power delivery transfer among multiple power sources in a multi-source electrical power system can be achieved by setting a voltage of a pickup source (e.g., the power source that is being added to the electrical bus) to a voltage that is higher than a voltage of the power source already delivering power to the electrical bus. This can result in power oscillations between the power sources because the higher voltage setpoint of the new power source can result in picking up the entire load on the electrical bus. This can potentially cause a drop in bus voltage as current increases and the load shifts back to the original source. In addition, the frequency of the source being connected to the bus can be slightly offset from the frequency of the bus. As a result, unknown and uncontrolled load shifting between sources can occur when the new source is added to the electrical bus.

In DC systems, a pickup source can be coupled to the electrical bus using power sources capable of sourcing or sinking loads up to and including the full power capability of each of the sources. In addition and/or in the alternative, complex algorithms can be used to adjust internal voltage setpoints among regulators for the power sources to reduce circulating current. These techniques can result in unknown and uncontrolled load shifts and can result in significant oscillations between power sources and large power losses.

Thus a need exists for systems and methods for transferring power delivery among power sources in a multi-source electrical power system while reducing power interruptions and disturbances in power quality.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method for transferring power delivery to an electrical bus between a first power source and a second power source. The method includes regulating, with a voltage regulator, an output voltage of the second power source based at least in part on a measured voltage of the electrical bus. The method further includes coupling the second power source to the electrical bus such that the first power source and the second power source are both coupled to the electrical bus for a transfer period. During the transfer period, the method includes allocating power delivery to the electrical bus from the first power source and the second power source such that the second power source provides a controlled power delivery to the electrical bus. The method further includes decoupling the first power source from the electrical bus at the end of the transfer period.

Another example aspect of the present disclosure is directed to an electrical power system. The electrical power system can include a first power source and a second power source. The second power source can include a power converter. The system can further include an electrical bus configured to be selectively coupled to the first power source and configured to be selectively coupled to the second power source. The system further includes a control system having a current regulator configured to regulate an output current of the power converter and a voltage regulator configured to regulate an output voltage of the power converter. When the control system receives a transfer signal indicative of initiating a transfer of power delivery to the electrical bus from the first power source to the second power source, the voltage regulator is configured to regulate the output voltage of the second power source to match a voltage associated with the electrical bus, and a current setpoint for the current regulator is adjusted to a fixed current setpoint of about zero amperes.

Another example aspect of the present disclosure is directed to a method for transferring power delivery to an electrical bus between a first power source and a second power source. The method includes setting a current setpoint of a current regulator associated with the second power source to a fixed current setpoint and coupling the first power source to the electrical bus such that both the first power source and the second power source are connected to the electrical bus for a transfer period. During the transfer period, the method includes regulating an output current of the second power source based at least in part on the fixed current setpoint. The method further includes decoupling the second power source from the electrical bus at the end of the transfer period.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects are directed to systems and methods for transferring power delivery between power sources to an electrical bus in a multi-source electrical power system. More particularly, a multi-source electrical power system can include an electrical bus having at least two power sources that each can be selectively coupled to the electrical bus, for instance, via contactors. At least one of the power sources can include a unidirectional or bidirectional power converter. The electrical power system can further include a control system configured to control the power output (e.g., the output voltage and the output current) of the power converter to provide no break power transfer of power delivery to the electrical bus between the first and second power sources.

In example embodiments, the no break power transfer can be achieved by regulating the output current of a power source to a fixed current value (e.g. about zero amperes) during a transfer period so that that the power source provides a known load when being connected or disconnected from the electrical bus. In some embodiments, the output current of the power source can be regulated in accordance with a current ramp during the transfer period. In addition and/or in the alternative, the no break power transfer can be implemented by providing a virtual resistance in a voltage regulator associated with the power source to provide a smooth transition between power sources.

More particularly, in one implementation, the power system can transfer power delivery from a first power source delivering power to an electrical bus to a second power source that is not delivering power to the electrical bus. The second power source can have a power converter that can be controlled to regulate the output current and the output voltage of the second power source.

A no break power transfer to the second power source can be implemented by initializing the second power source for connecting to the electrical bus. Initializing the second power source can include setting a current setpoint of a current regulator associated with the second power source to a fixed current setpoint, such as about zero amperes. Initializing the power source can further include regulating, with a voltage regulator associated with the second power source, the output voltage of the second power source to match a voltage of the electrical bus.

Once the second power source has been initialized, the power system can couple the second power source to the electrical bus such that both the first power source and the second power source are coupled to the electrical bus for a transfer period. During the transfer period, power delivery to the electrical bus can be allocated between the first power source and the second power source such that the second power source provides a controlled power delivery to the electrical bus.

For instance, in some embodiments, allocating power delivery to the electrical bus from the first power source and the second power source can include regulating, with a current regulator, an output current of the second power source based at least in part on a fixed current setpoint during the transfer period. In particular embodiments, the fixed current setpoint can be about zero amperes so that the second current source does not deliver any power to the electrical bus during the transfer period. Because the output voltage of the second power source is being regulated to match the voltage of the electrical bus, the second power source can be controlled so that it does not source or sink current from the electrical bus, leading to reduced power oscillations during power transfers.

In some embodiments, allocating power delivery to the electrical bus from the first power source and the second power source can include regulating, with a current regulator, an output current of the second power source based at least in part on a current ramp during the transfer period. The current ramp can specify a gradual increase in current over the transfer period. The increase can be linear, exponential, in stepped increments or other suitable increase in current over the transfer period. In this embodiment, the current regulator can receive current feedback from both the first power source and the second power source or other suitable current feedback indicative of the total current provided to the electrical bus.

In some embodiments, allocating power delivery to the electrical bus from the first power source and the second power source during the transfer period can include regulating, with a voltage regulator, the output voltage of the second power source based at least in part on a virtual resistance programmed into the voltage regulator. The actual output current of the second power source can be multiplied by the virtual resistance to obtain a voltage adjustment. The voltage adjustment can be subtracted from the voltage setpoint provided to the voltage regulator such that the output voltage of the second power source is reduced as an output current provided from the second power source is increased. In this embodiment, the power source can pick up some of the power delivery to the electrical bus during the transfer period to provide a smooth transition from the first power source to the second power source.

At the end of the transfer period, the first power source can be decoupled from the electrical bus. Once the first power source is decoupled from the electrical bus, the second power source can be regulated using the voltage regulator to deliver the power to the electrical bus based on a voltage setpoint. The current regulation provided by the current regulator based on a fixed current setpoint (e.g., zero amperes) can be terminated once the first power source is decoupled from the electrical bus.

In another implementation, the power system can transfer power delivery from the second power source delivering power to an electrical bus to a first power source that is not delivering power to the electrical bus. The second power source can have a power converter that can be controlled to regulate the output current and the output voltage of the second power source.

More particularly, a no break power transfer can occur by initializing the second power source for transfer of power to the first power source. Initializing the second power source can include setting a current setpoint of a current regulator associated with the second power source to a fixed current setpoint, such as about zero amperes. This can cause the second power source to provide an output voltage that drifts against a minimum voltage limit for the power converter.

Once the second power source has been initialized, the power system can couple the first power source to the electrical bus such that both the first power source and the second power source are coupled to the electrical bus for a transfer period. During the transfer period, the output current of the second power source can be regulated, using a current regulator, based at least in part on the fixed current setpoint (e.g., zero amperes). In some embodiments, the output current of the power source can be regulated in accordance with a current ramp during the transfer period. In this manner, the second power source is controlled to provide a known load during the transfer period. At the end of the transfer period, the second power source can be decoupled from the electrical bus.

Example aspects of the present disclosure can have a technical effect of providing for the no break transfer of power delivery among power sources in a multi-source power system. As a result, voltage drops, spikes and/or large circulating currents during transfer of power delivery among power sources to an electrical bus can be reduced.

Figure 1:
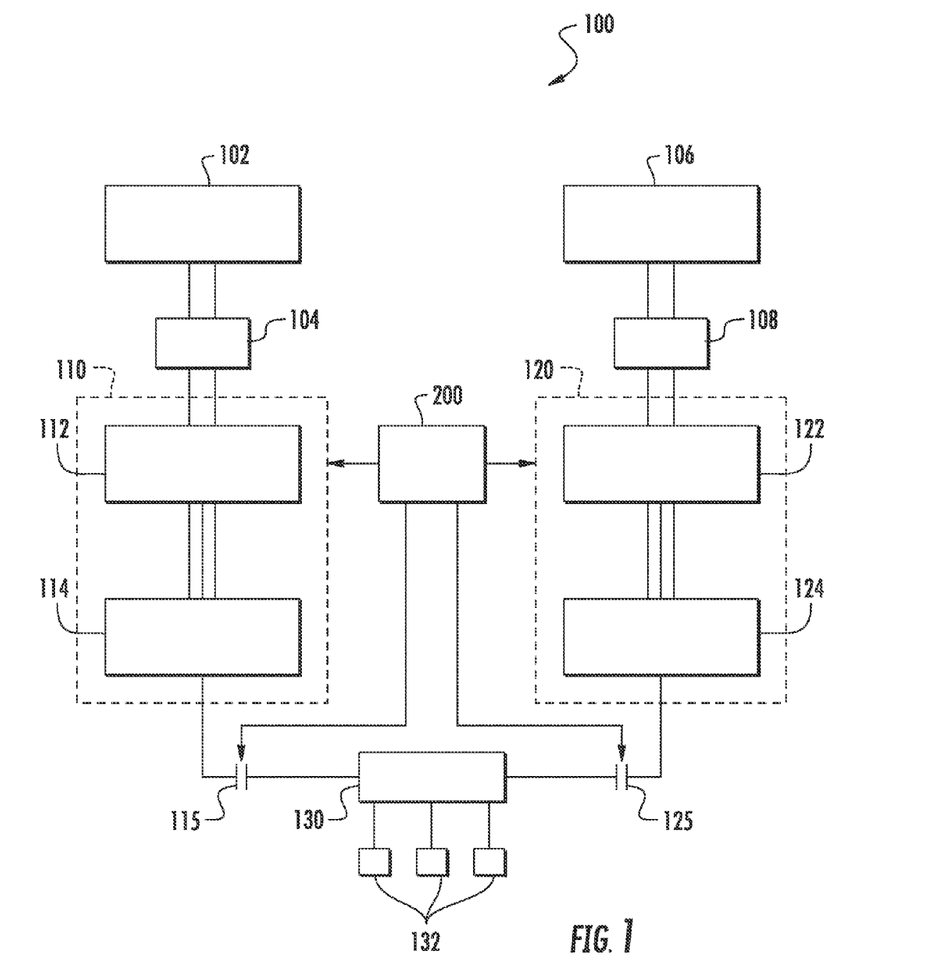
FIG. 1 depicts an example electrical system according to example embodiments of the present disclosure.

FIG. 1 depicts an example electrical power system 100 according to example aspects of the present disclosure. The electrical power system 100 can be associated with, for instance, an aircraft. The electrical power system 100 can include a first power source 110 and a second power source 120. The first power source 110 and the second power source 120 can be coupled to an electrical bus 130, such as a DC electrical bus. One or more loads 132 (e.g., electrical loads used by the aircraft) can be coupled to the electrical bus 130.

The first power source 110 can include a generator 112 configured to generate three-phase AC power. The generator 112 can be coupled to a power converter 114 that can be controlled to convert the three-phase AC power to a DC output for application to the electrical bus 130. In some embodiments, the generator 112 can be mechanically powered by a gas turbine engine 102 associated with an aircraft via a gearbox 104.

Similarly, the second power source 120 can include a generator 122 configured to generate three-phase AC power. The generator 122 can be coupled to a power converter 124 that can be controlled to convert the three-phase AC power to a DC output for application to the electrical bus 130. In some embodiments, the generator 122 can be mechanically powered by a gas turbine engine 106 associated with an aircraft via a gearbox 108.

The system can include a control system 200. The control system 200 can include one or more controllers, sensors and/or other control devices configured to perform various measurements (e.g., voltage and/or current measurements) and to control various aspects of the power system 100. In some embodiments, the control system 200 can include one or more processors and one or more memory devices. The memory devices can include computer-readable instructions or other logic that when executed by the one or more processors cause the control system to provide desired control functionality, such as implementing one or more current regulators, voltage regulators, or other control functions set forth in the present disclosure.

As shown in FIG. 1, the control system 200 can provide control signals to the first power source 110 and the second power source 120 to control the power output (e.g., the output voltage and/or the output current) by the first power source 110 and/or the second power source 120. For instance, control signals can be provided to the converters 114, 124 to regulate the voltage and current outputs of the first power source 110 and the second power source 120 to provide a no break power transfer according to example aspects of the present disclosure, as will be discussed in more detail below.

The control system 200 can also provide control signals to contactor 115 and to contactor 125. The contactor 115 can be used to selectively couple and decouple the first power source 110 to the electrical bus 130. The contactor 125 can be controlled to selectively couple and decouple the second power source 120 to the electrical bus 130.

Example embodiments of the present disclosure are discussed with reference to the example multi-source electrical power system 100 for use with an aircraft for purposes of illustration and discussion. Those of ordinary skill in the art, using the disclosures provided herein, shall understand that the present subject matter can be used with any suitable multi-source power system without deviating from the scope of the present disclosure. For example, the multi-source electrical power system may or may not be associated with an aircraft or other airborne power system. In some embodiments, the multisource electrical power system can include any combination of DC power sources and AC power sources. In some embodiments, at least one of the power systems (e.g., only one of the power sources) can be associated with a power converter. The electrical bus can be a DC electrical bus or an AC electrical bus.

Figure 2:
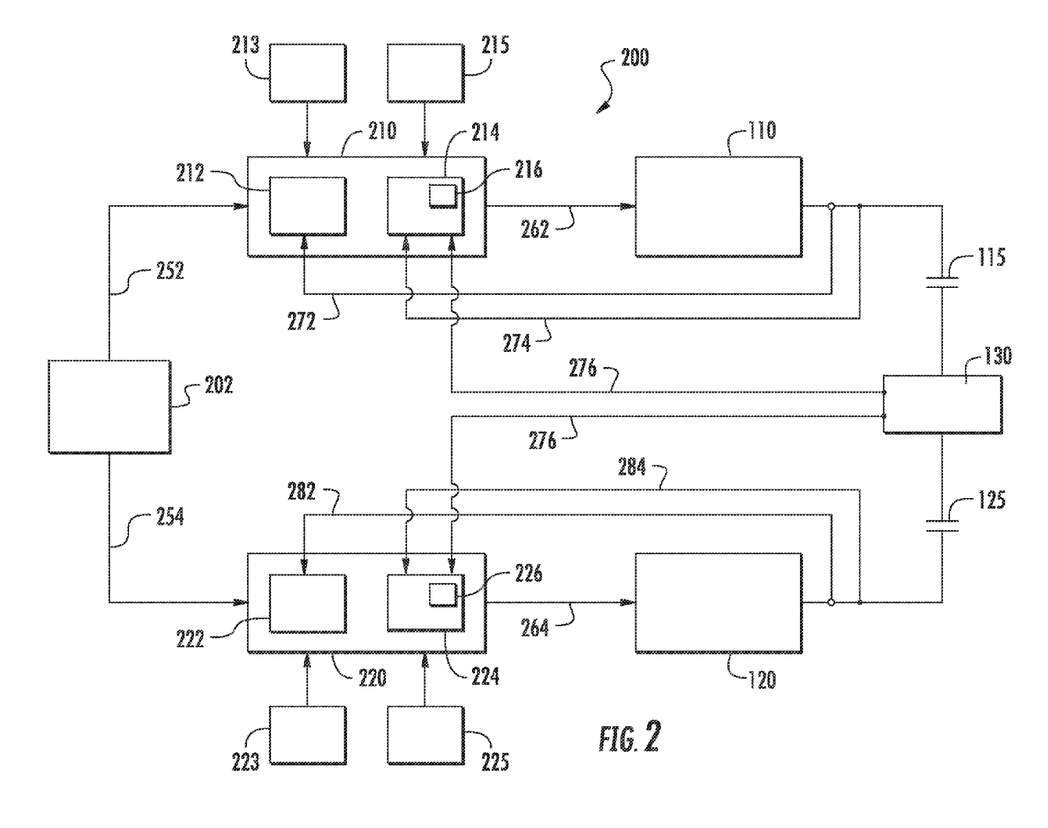
FIG. 2 depicts aspects of an example control system according to example embodiments of the present disclosure.

FIG. 2 depicts aspects of an example control system 200 for implementing the controls methods and systems according to example embodiments of the present disclosure. The system can include a control block 202 configured to generated power delivery commands 252, 254 (e.g., current setpoint signals or other signals representing the desired allocation of power delivery among the first power source 110 and the second power source 120). The control block 202 can provide the power delivery command 252 to a first control structure 210 associated with the first power source 110 and the power delivery command 254 a second control structure 220 associated with the second power source 120.

As used herein, a control structure or control block refers to control logic or circuitry configured to implement one or more control functions, such as one or more of the controller functions, control loop functions, transform functions, and other control functions disclosed herein. In some implementations, a control structure can refer to a set of instructions stored in a memory device that when executed by one or more control devices (e.g., microprocessor(s), microcontroller(s), etc.), cause the one or more control devices to provide the desired control functionality. The control logic can be implemented at any suitable location, such as by a separate control device or one or more controllers associated with the power system, such as control system 200, control device associated with power source 110, control device associated with power source 120, or other suitable power source.

The power delivery commands 252, 254 can be indicative of a ratio of the load being handled by the respective power source 110, 120 relative to the total power to be delivered by the power sources 110 and 120 to the electrical bus 130. In some embodiments, the power delivery commands 252, 254 can include current setpoint components or can be used to derive current setpoints to provide the desired allocation of power delivery among the first power source 110 and the second power source 120. For instance, if it is desired that the second power source 120 provide no power to the electrical bus 130, a current reference of zero amperes can be provided as part of the power delivery command 254 or can be derived from the power delivery command 254 indicating that no power should be delivered to the electrical bus 130.

The first control structure 210 can be configured to provide one or more command signals 262 to the first power source 110 to control the output voltage and/or output current of the first power source 110. The first control structure 210 can include a current regulator 212 and a voltage regulator 214. The current regulator 212 can be configured to regulate the output current of the first power source 110 based at least in part on a current setpoint signal (e.g., as part of the power delivery command 252) and/or current feedback signals 272, 282. The current regulator 212 can be, for instance, a proportional integral regulator, a proportional derivative regulator, a proportional integral derivative regulator, or other suitable regulator. The current feedback signal 272 can be provided from a sensor or other current measurement device configured to provide a signal indicative of the output current by the first power source 110. The current feedback signal 282 can be provided from a sensor or other current measurement device configured to provide a signal indicative of the output current by the second power source 120.

The voltage regulator 214 can be configured to regulate the output voltage of the first power source 110 based at least in part on one or more voltage setpoint signals, a voltage feedback signal 274 indicative of the output voltage of the first power source, and/or a voltage feedback signal 276 indicative of a voltage of the electrical bus. The voltage regulator 214 can be, for instance, a proportional integral regulator, a proportional derivative regulator, a proportional integral derivative regulator, or other suitable regulator. The voltage feedback signal 274 can be provided from a sensor or other voltage measurement device configured to provide a signal indicative of the output voltage of the first power source 110. The voltage feedback signal 276 can be provided from a sensor or other voltage measurement device configured to provide a signal indicative of the voltage of the electrical bus 130.

In some embodiments, the voltage regulator 214 can include a virtual resistance 216 programmed into the voltage regulator 214. The magnitude of the virtual resistance 216 can be calculated based on various operational parameters of the power system. The virtual resistance 216 can be used in regulating the output voltage of first power source 110. For instance, in some embodiments, the voltage regulator 214 can be configured to multiply the virtual resistance 216 by the output current (e.g., as indicated by current feedback signal 272) to obtain a voltage adjustment. The voltage regulator 214 can be configured to subtract the voltage adjustment from a voltage setpoint used by the voltage regulator 214 in regulating the output voltage of the first power source 110. In this way, the virtual resistance 216 when implemented can provide droop control functionality.

The first control structure 210 can also access a minimum voltage reference 213 and a maximum voltage reference 215. The first control structure 210 can use the minimum voltage reference 213 and the maximum voltage reference 215 to limit the command signal(s) 262 provided to the first power source 110 such that the output voltage of the first power source 110 does not drop below the minimum voltage reference 213 or exceed the maximum voltage reference 215.

The second control structure 220 can be configured to provide one or more command signals 264 to the second power source 120 to control the output voltage and/or output current of the second power source 120. The second control structure 220 can include a current regulator 222 and a voltage regulator 224. The current regulator 222 can be configured to regulate the output current of the second power source 120 based at least in part on a current setpoint signal (e.g., as part of the power delivery command 254) and/or current feedback signal 272, 282. The current regulator 222 can be, for instance, a proportional integral regulator, a proportional derivative regulator, a proportional integral derivative regulator, or other suitable regulator. The current feedback signal 272 can be provided from a sensor or other current measurement device configured to provide a signal indicative of the output current by the first power source 110. The current feedback signal 282 can be provided from a sensor or other current measurement device configured to provide a signal indicative of the output current by the second power source 120.

The voltage regulator 224 can be configured to regulate the output voltage of the second power source 120 based at least in part on one or more voltage setpoint signals, a voltage feedback signal 284 indicative of the output voltage of the second power source, and/or a voltage feedback signal 276 indicative of a voltage of the electrical bus. The voltage regulator 224 can be, for instance, a proportional integral regulator, a proportional derivative regulator, a proportional integral derivative regulator, or other suitable regulator. The voltage feedback signal 284 can be provided from a sensor or other voltage measurement device configured to provide a signal indicative of the output voltage of the second power source 120.

In some embodiments, the voltage regulator 224 can include a virtual resistance 226 programmed into the voltage regulator 224. The magnitude of the virtual resistance 226 can be calculated based on various operational parameters of the power system. The virtual resistance 226 can be used in regulating the output voltage of the second power source 120. For instance, in some embodiments, the voltage regulator 224 can be configured to multiply the virtual resistance 226 by the output current (e.g., as indicated by current feedback signal 282) to obtain a voltage adjustment. The voltage regulator 224 can be configured to subtract the voltage adjustment from a voltage setpoint used by the voltage regulator 224 in regulating the output voltage of the second power source 120. In this way, the virtual resistance 226 when implemented can provide droop control functionality.

The first control structure 220 can also access a minimum voltage reference 223 and a maximum voltage reference 225. The second control structure 220 can use the minimum voltage reference 223 and the maximum voltage reference 225 to limit the command signal(s) 264 provided to the second power source 120 such that the output voltage of the second power source 120 does not drop below the minimum voltage reference 223 or exceed the maximum voltage reference 225.

Figure 3:
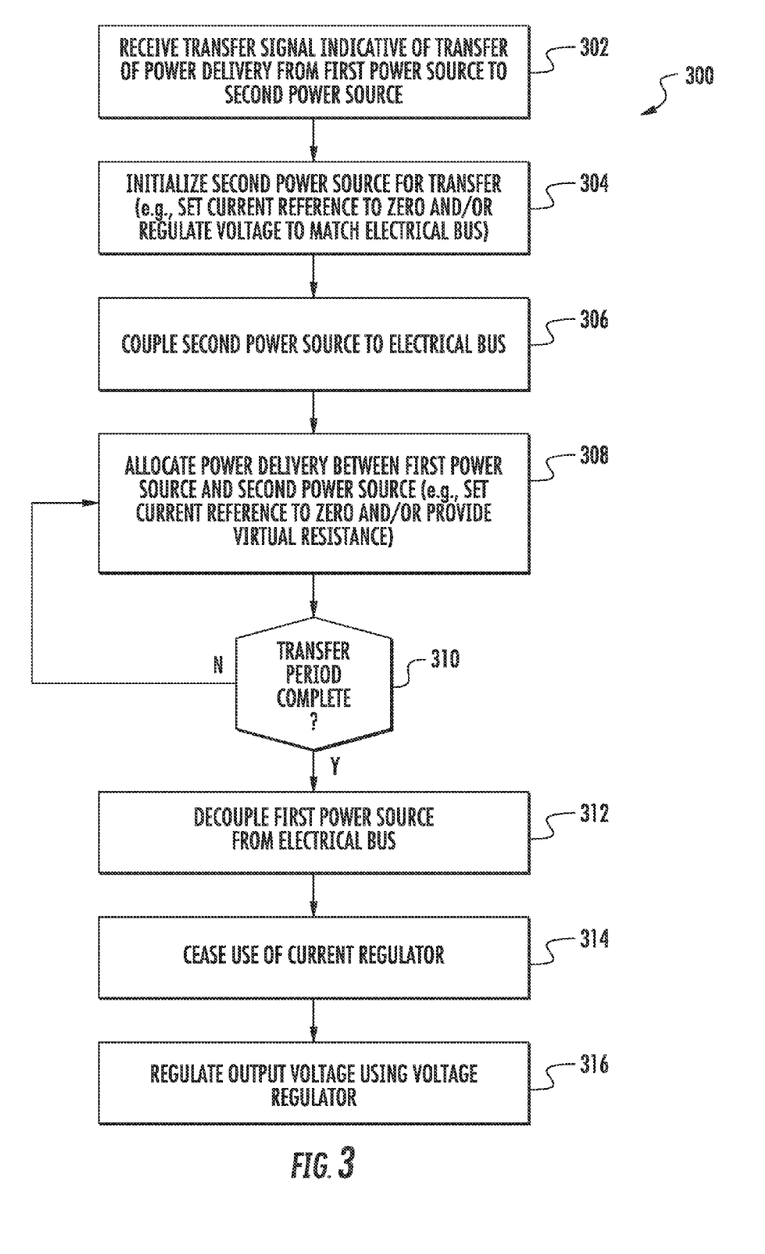
FIG. 3 depicts a method of transferring power delivery to a power source associated with a power converter according to example embodiments of the present disclosure.

FIG. 3 depicts flow diagram of one example method (300) of transferring power delivery from a first power source to a second power source having a power converter according to example embodiments of the present disclosure. In some embodiments, the method (300) can be implemented using the control system depicted in FIG. 2 or other suitable control scheme. In addition, FIG. 3 depicts steps performed in a particular order for purposes of illustration and discussion. Those of ordinary skill in the art, using the disclosures provided herein, will understand that various aspects of any of the methods disclosed herein can be modified, adapted, rearranged, omitted, or expanded in various ways without deviating from the scope of the present disclosure.

At (302), a transfer signal can be received indicative of transferring power delivery from a first power source to the second power source. For instance, a transfer signal can be received or generated at control system 200 of FIG. 1 indicating a transfer of power delivery to the electrical bus 130 from the first power source 110 to the second power source 120. The transfer signal can be generated as part of the internal control logic of the control system 200 or received from an external source, such as a signal responsive to an operator input requesting a transfer of power delivery.

Referring to FIG. 3 at (304), the second power source can be initialized for transfer to the electrical bus. For instance, referring to FIG. 1, the second power source 120 can be initialized for transfer to the electrical bus 130. In some embodiments, initializing the second power source for transfer to the electrical bus can include setting a current setpoint for the current regulator associated with the second power source to a fixed current setpoint, such as about zero amperes. As used herein, the use of the term about zero amperes refers to 10% of the rated current of the power sources or less.

Referring to FIG. 2 as an example, a current setpoint associated with the current regulator 222 of the second control structure 220 associated with the second power source 120 can be set to about zero amperes. In some embodiments, the power delivery command 254 provided to the control structure 220 can include a component providing a fixed current setpoint of about zero amperes to the current regulator 222.

Initializing the second power source for transfer to the electrical bus can further include regulating, with a voltage regulator, an output voltage of the second power source based on a measured voltage of the electrical bus. Referring to FIG. 2 as an example, a voltage setpoint for the voltage regulator 224 can be determined based at least in part on the voltage feedback signal 276 indicative of the voltage of the electrical bus 130. In some embodiments, the voltage regulator can regulate the output voltage to match a voltage of the electrical bus. In cases where the electrical bus is a DC bus, matching a voltage of the electrical bus can include matching (e.g., coming to within 20% of) a magnitude of a voltage associated with the electrical bus. In cases where the electrical bus is an AC bus, matching a voltage of the electrical bus can include matching a magnitude, phase, and frequency of the electrical bus.

Referring to FIG. 3 at (306), the method can include coupling the second power source to the electrical bus such that both the first power source and the second power source are coupled to the electrical bus for a transfer period. For instance, the control system 200 of FIG. 1 can control contactor 125 to couple the second power source 120 to the electrical bus 130.

Once the second power source is coupled to the electrical bus, the method can include allocating power delivery between the first power source and the second power source such that the second power source provides controlled power delivery to the electrical bus for the transfer period as shown at (308) of FIG. 3. Allocating power delivery between the first power source and the second power source according to example aspects of the present disclosure can include regulating an output current of the second power source based at least in part on a fixed current setpoint, a current ramp and/or implementing a virtual resistance as part of the voltage regulator.

For instance, in one embodiment, a current regulator associated with the second power source can be engaged based on a fixed current setpoint so that the output current of second power source is regulated to the fixed current setpoint. In some embodiments, the fixed current setpoint is about zero amperes so that the second power source is controlled to provide no power to the electrical bus during the transfer period.

As an example, the command signal 254 received by the control structure 220 from control block 202 can be include or be used to derive a fixed current setpoint of about zero amps. The current regulator 222 can regulate the output current of the second power source 120 based at least in part on the current feedback signal 282 and the fixed current setpoint of about zero amps so that little to no output current is provided by second power source 120 to the electrical bus 130 during the transfer period.

In embodiments where a current regulator associated with the second power source receives current feedback indicative of the total current on the electrical bus, allocating power delivery to the electrical bus from the first power source and the second power source can include regulating, with a current regulator, an output current of the second power source based at least in part on a current ramp during the transfer period. The current ramp can specify a gradual increase in current over the transfer period. The increase can be linear, exponential, in stepped increments or other suitable increase in current over the transfer period. In this embodiment, the current regulator can receive current feedback from both the first power source and the second power source or other suitable current feedback indicative of the total current provided to the electrical bus.

In another embodiment, a virtual resistance can be implemented as part of a voltage regulator associated with the second power source. The virtual resistance can be used to regulate the power delivery to the electrical bus by adjusting the output voltage of the second power source as the output current of the second power source increases.

Referring to FIG. 2 as an example, the virtual resistance 226 programmed into regulator 224 can be multiplied by an output current of the power source 120 (e.g., as determined from feedback signal 282) to obtain an adjusted voltage. The adjusted voltage can be subtracted from the voltage setpoint used by the voltage regulator 224 to regulate the output voltage of the power source 120. In this way, the output voltage can be decreased as the output current increases, providing controlled power delivery from the second power source 120 to the electrical bus 130.

As shown at (310) of FIG. 3, the method allocates power according to (308) until the transfer period is determined to be complete. The transfer period can be determined to be complete after the expiration of a predetermined period of time. In addition and/or in the alternative, the transfer period can be determined to be complete upon the occurrence of a trigger condition, such as signals indicative of the first power source 110 being ready for decoupling from the electrical bus 130

At the end of the transfer period, the method includes decoupling the first power source form the electrical bus as shown at (312) of FIG. 3. For instance, the control system 200 can control contactor 115 to decouple the first power source 110 from the electrical bus 130.

Once the first power source has been decoupled from the electrical bus, the method can include ceasing regulation of the output current of the second power source with the current regulator as shown at (314) of FIG. 3. For instance, the current regulator 222 can be disengaged such that the output current of the power source 120 is no longer regulated to a fixed current setpoint (e.g., zero amps).

At (316), the method can include regulating the output voltage of the second power source using the voltage regulator based on a voltage setpoint. For instance, the voltage regulator 224 can be used use to regulate the output voltage of the second power source 120 based on a voltage setpoint and a feedback signal 284 indicative of the output voltage of the second power source 120. The voltage setpoint can be set to a desired voltage of the electrical bus 130. The output current provided by the second power source can be based at least in part on the loads connected to the electrical bus.

In some embodiments, the change in regulators set forth in (314) and (316) of FIG. 3 can be performed in response to receiving a signal indicative of the first power source being decoupled from the electrical bus. The signal can be based on, for instance, sensing the status of the contactor coupling/decoupling the first power source to the electrical bus, a command from the control system, and/or the expiration of a predefined time period.

Figure 4:
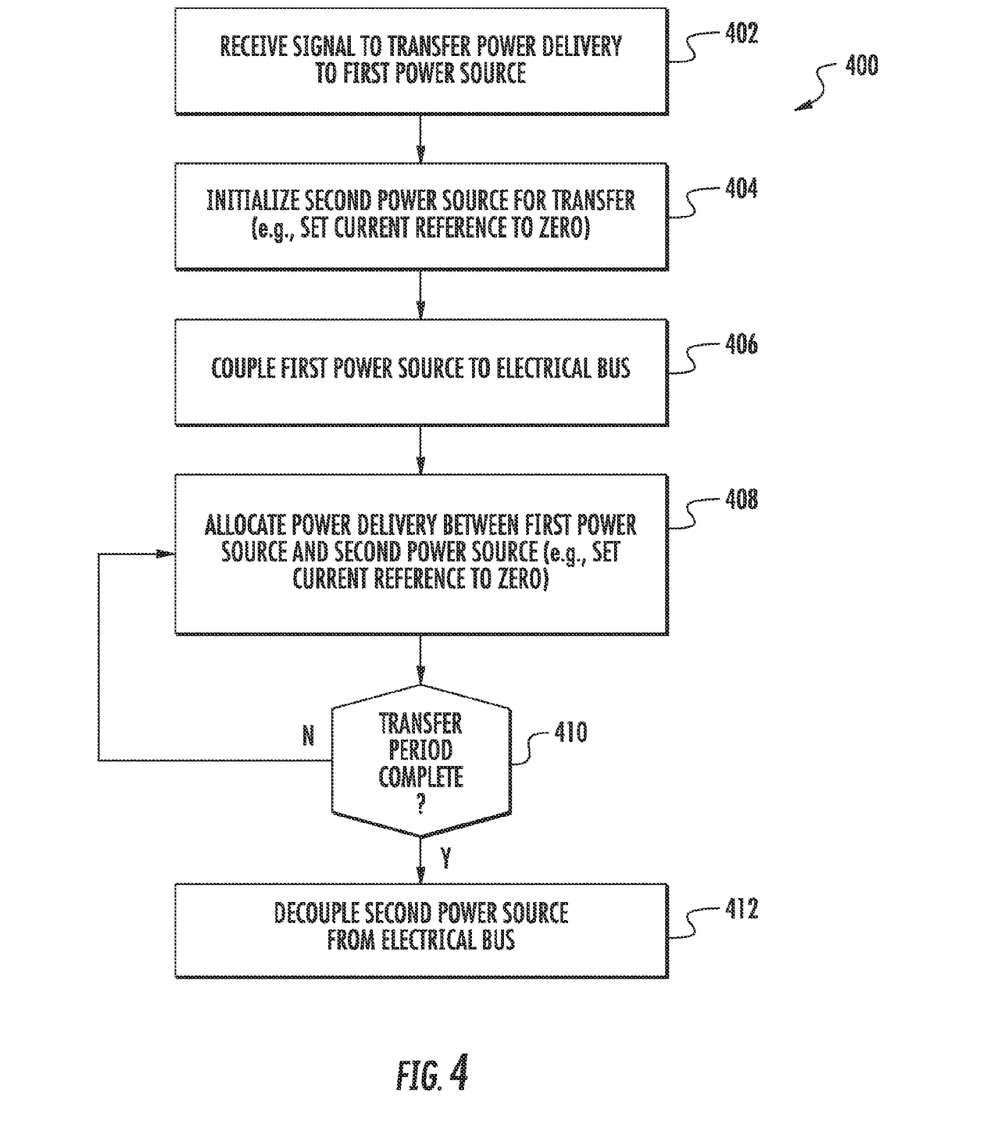
FIG. 4 depicts a method of transferring power delivery from a power source associated with a power converter according to example embodiments of the present disclosure.

FIG. 4 depicts flow diagram of one example method (400) of transferring power delivery from a second power source having a power converter to a first power source according to example embodiments of the present disclosure. In some embodiments, the method (400) can be implemented using the control system depicted in FIG. 2 or other suitable control scheme. In addition, FIG. 4 depicts steps performed in a particular order for purposes of illustration and discussion. Those of ordinary skill in the art, using the disclosures provided herein, will understand that various aspects of any of the methods disclosed herein can be modified, adapted, rearranged, omitted, or expanded in various ways without deviating from the scope of the present disclosure.

At (402), a transfer signal can be received indicative of transferring power delivery from the second power source to the first power source. For instance, a transfer signal can be received or generated at control system 200 of FIG. 2 indicating a transfer of power delivery to the electrical bus 130 from the second power source 120 to the first power source 110. The transfer signal can be generated as part of the internal control logic of the control system 200 or received from an external source, such as a signal responsive to an operator input requesting a transfer of power delivery.

In response to the transfer signal, the second power source can be initialized for transferring power delivery to the electrical bus as shown at (404) of FIG. 4. For instance, the second power source 120 can be initialized to drop the electrical bus 130. In some embodiments, initializing the second power source for transferring power delivery to the electrical bus can include setting a current setpoint for the current regulator associated with the second power source to a fixed current setpoint, such as about zero amperes. Referring to FIG. 2 as an example, a current setpoint associated with the current regulator 222 of the second control structure 220 can be set to about zero amperes.

At (406) of FIG. 4, the method can include coupling the first power source to the electrical bus such that both the first power source and the second power source are coupled to the electrical bus for a transfer period. For instance, the control system 200 of FIG. 2 can control contactor 115 to couple the first power source 110 to the electrical bus 130.

Once the first power source is coupled to the electrical bus, the method can include allocating power delivery between the first power source and the second power source such that the second power source provides controlled power delivery to the electrical bus for the transfer period as shown at (408) of FIG. 4. Allocating power delivery between the first power source and the second power source according to example aspects of the present disclosure can include regulating an output current of the second power source based at least in part on a fixed current setpoint, a current ramp (e.g., a gradual decrease in current) and/or implementing a virtual resistance as part of the voltage regulator associated with the second power source.

For instance, in one embodiment, a current regulator associated with the second power can be engaged based on a fixed current setpoint so that the output current of second power source is regulated to the fixed current setpoint. In some embodiments, the fixed current setpoint is about zero amperes so that the second power source is controlled to provide no power to the electrical bus during the transfer period.

In embodiments where a current regulator associated with the second power source receives current feedback indicative of the total current on the electrical bus, allocating power delivery to the electrical bus from the first power source and the second power source can include regulating, with a current regulator, an output current of the second power source based at least in part on a current ramp during the transfer period. The current ramp can specify a gradual decrease in current over the transfer period. The decrease can be linear, exponential, in stepped increments or other suitable decrease in current over the transfer period. In this embodiment, the current regulator can receive current feedback from both the first power source and the second power source or other suitable current feedback indicative of the total current provided to the electrical bus.

In another embodiment, a virtual resistance can be implemented as part of a voltage regulator associated with the second power source. The virtual resistance can be used to regulate the power delivery to the electrical bus by adjusting the output voltage of the second power source as the output current of the second power source increases as discussed in detail above.

As shown at (410), the method allocates power according to (408) until the transfer period is determined to be complete. The transfer period can be determined to be complete after the expiration of a predetermined period of time. In addition and/or in the alternative, the transfer period can be determined to be complete upon the occurrence of a trigger condition, such as signals indicative of the second power source 120 being ready for decoupling from the electrical bus 130

At the end of the transfer period, the method includes decoupling the second power source form the electrical bus as shown at (412) of FIG. 4. For instance, the control system 200 can control contactor 125 to decouple the second power source 120 from the electrical bus 130.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for transferring no break power delivery between power sources to an electrical bus, the method comprising:
   receiving a transfer signal indicative of initiating a transfer of power delivery to the electrical bus from a first power source to a second power source;
   initializing the second power source for transfer to the electrical bus;
   coupling the second power source to the electrical bus such that the first power source and the second power source are both coupled to the electrical bus for a transfer period;
   during the transfer period, regulating, with a current regulator associated with the second power source, an output current of the second power source to be about zero amperes such that the second power source provides about zero power to the electrical bus; and
   decoupling the first power source from the electrical bus at the end of the transfer period.

2. The method of claim 1, wherein initializing the second power source for transfer to the electrical bus comprises setting a current setpoint for the current regulator to a fixed current setpoint of about zero amperes.

3. The method of claim 1, wherein initializing the second power source for transfer to the electrical bus comprises setting a current ramp for the current regulator.

4. The method of claim 1, wherein after decoupling the first power source from the electrical bus, the method further comprises regulating, with a voltage regulator, an output voltage of the second power source.

5. The method of claim 2, wherein regulating, with the current regulator, the output current of the second power source to be about zero amperes comprises regulating, with the current regulator, the output current of the second power source based at least in part on the fixed current setpoint during the transfer period.

6. The method of claim 3, wherein regulating, with the current regulator, the output current of the second power source to be about zero amperes comprises ramping, with the current regulator, the output current of the second power source to be about zero amperes in accordance with the current ramp during the transfer period.

7. The method of claim 1, wherein after decoupling the first power source from the electrical bus, the method ceases regulating the output current of the second power source with the current regulator.

8. The method of claim 1, wherein initializing the second power source for transfer to the electrical bus further comprises regulating, with a voltage regulator, an output voltage of the second power source based at least in part on a measured voltage of the electrical bus.

9. The method of claim 1, wherein the method further comprises:
   receiving a transfer signal indicative of initiating a transfer of power delivery to the electrical bus from the second power source back to the first power source;
   setting a current setpoint of the current regulator to a fixed current setpoint of about zero amperes;
   coupling the first power source to the electrical bus such that both the first power source and the second power source are connected to the electrical bus for a second transfer period; and
   during the second transfer period, regulating the output current of the second power source based at least in part on the fixed current setpoint of about zero amperes; and
   decoupling the second power source from the electrical bus at the end of the second transfer period.

10. The method of claim 1, wherein the second power source comprises a power converter.

11. The method of claim 10, wherein the electrical bus is a DC bus or AC bus associated with an aircraft.

12. The method of claim 10, wherein the first power source and the second power source each comprise a generator, each generator being mechanically powered by a gas turbine engine of the aircraft.

13. An electrical power system, comprising:
   a first power source;
   a second power source, the second power source comprising a power converter;
   an electrical bus configured to be selectively coupled to the first power source and configured to be selectively coupled to the second power source;
   a control system comprising a current regulator configured to regulate an output current of the power converter, the control system further comprising a voltage regulator configured to regulate an output voltage of the power converter;
   wherein when the control system receives a transfer signal indicative of initiating a transfer of power delivery to the electrical bus from the first power source to the second power source, the voltage regulator is configured to regulate the output voltage of the second power source to match a voltage associated with the electrical bus, and a current setpoint for the current regulator is adjusted to a fixed current setpoint of about zero amperes.

14. The electrical power system of claim 13, wherein responsive to the transfer signal, the control system is configured to couple the second power source to the electrical bus such that the first power source and the second power source are both coupled to the electrical bus for a transfer period.

15. The electrical power system of claim 14, wherein during the transfer period, the current regulator is configured to regulate an output current of the second power source based at least in part on the fixed current setpoint of zero amperes.

16. The electrical power system of claim 14, wherein the control system is configured to decouple the first power source from the electrical bus at the end of the transfer period.

17. A method for transferring no break power delivery to an electrical bus from a second power source to a first power source, the method comprising:
- receiving a transfer signal indicative of initiating a transfer of power delivery to the electrical bus from the second power source to the first power source;
- setting a current setpoint of a current regulator associated with the second power source to a fixed current setpoint about zero amperes;
- coupling the first power source to the electrical bus such that both the first power source and the second power source are connected to the electrical bus for a transfer period;
- during the transfer period, regulating an output current of the second power source based at least in part on the fixed current setpoint to provide about zero power to the electrical bus from the second power source; and
- decoupling the second power source from the electrical bus at the end of the transfer period.

18. The method of claim 17, wherein the second power source comprises a power converter.

* * * * *